(12) United States Patent
Liu et al.

(10) Patent No.: US 11,743,758 B2
(45) Date of Patent: Aug. 29, 2023

(54) DATA TRANSMISSION METHOD AND APPARATUS, DATA SENDING METHOD AND APPARATUS, AND DATA TRANSMISSION SYSTEM

(71) Applicant: ZTE CORPORATION, Shenzhen (CN)

(72) Inventors: Zhuang Liu, Shenzhen (CN); Yin Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 57 days.

(21) Appl. No.: 17/261,704

(22) PCT Filed: Sep. 27, 2019

(86) PCT No.: PCT/CN2019/108611
§ 371 (c)(1),
(2) Date: Jan. 20, 2021

(87) PCT Pub. No.: WO2020/063891
PCT Pub. Date: Apr. 2, 2020

(65) Prior Publication Data
US 2021/0297894 A1    Sep. 23, 2021

(30) Foreign Application Priority Data
Sep. 28, 2018  (CN) .......................... 201811141708.3

(51) Int. Cl.
*H04W 28/02* (2009.01)
*H04W 24/08* (2009.01)
(Continued)

(52) U.S. Cl.
CPC ....... *H04W 28/0268* (2013.01); *H04W 24/08* (2013.01); *H04W 28/24* (2013.01); *H04W 72/542* (2023.01); *H04W 72/566* (2023.01)

(58) Field of Classification Search
None
See application file for complete search history.

(56) References Cited

U.S. PATENT DOCUMENTS 11,357,004 B1 * 6/2022 Pawar .................. H04L 5/0098
2018/0234524 A1 * 8/2018 Cheng ................ H04L 41/0803
(Continued)

FOREIGN PATENT DOCUMENTS

CN     101795442 A     8/2010
CN     101815030 A     8/2010
(Continued)

OTHER PUBLICATIONS

Ericsson, S5-182557: pCR 28.552 Add DL packet drop UC and measurements, Apr. 9-13, 2018 (Year: 2018).*
(Continued)

*Primary Examiner* — The Hy Nguyen
(74) *Attorney, Agent, or Firm* — GEORGE MCGUIRE

(57) ABSTRACT

Provided are a data transmission method and apparatus, a data sending method and apparatus, and a data transmission system. The data transmission method includes: receiving, by a second network node, data which carries a protocol data unit (PDU) and is sent by a first network node, where the PDU at least includes quality of service (QOS) information bearing the data, and the QOS information includes at least one of: a QOS flow identifier (QFI) indication of the data, or a fifth-generation QOS identifier (5QI) corresponding to the data.

16 Claims, 6 Drawing Sheets

A second network node receives data which carries a protocol data unit (PDU) and is sent by a first network node, where the PDU at least includes quality of service (QOS) information bearing the data, and the QOS information includes at least one of: a QOS flow identifier (QFI) indication of the data, or a fifth-generation QOS identifier (5QI) corresponding to the data ~ S302

(51) Int. Cl.
  *H04W 28/24* (2009.01)
  *H04W 72/542* (2023.01)
  *H04W 72/566* (2023.01)

(56) References Cited

U.S. PATENT DOCUMENTS

| | | | |
|---|---|---|---|
| 2021/0014722 A1* | 1/2021 | Han | H04W 28/0263 |
| 2021/0084539 A1* | 3/2021 | Centonza | H04W 28/12 |
| 2021/0204160 A1* | 7/2021 | Jo | H04W 28/14 |
| 2021/0274374 A1* | 9/2021 | Lundqvist | H04W 28/0236 |

FOREIGN PATENT DOCUMENTS

| | | | |
|---|---|---|---|
| CN | 1017954442 A | 8/2010 | |
| CN | 102448053 A | 5/2012 | |
| CN | 107018542 A | 8/2017 | |
| JP | 2016184867 A * | 10/2016 | |
| WO | 2012159321 A1 | 11/2012 | |
| WO | 2018077043 A1 | 5/2018 | |
| WO | 2018147958 A1 | 8/2018 | |
| WO | WO-2019029581 A1 * | 2/2019 | ............ H04W 28/24 |
| WO | WO-2022155108 A1 * | 7/2022 | |

OTHER PUBLICATIONS

International Search Report Form PCT/ISA/210, and Written Opinion Form PCT/ISA/237, International Application No. PCT/CN2019/108611, pp. 1-5 International Filing Date Sep. 27, 2019 dated Jan. 6, 2020.

Huawei. "Bearer Management over F1" 3GPP TSG-RAN3 Meeting #97 R3-173110, Aug. 25, 2017 (Aug. 25, 2017), pp. 1-2, and figure 1.

Translated CN Office Action, dated Jul. 19, 2022. pp. 1-5.

Translated CN First Search Report, pp. 1-2.

Ericsson "pCR 28.552 Add DL packet drop UC and measurements" 3GPTT TSG-SA5 Meeting #118 Apr. 9-13, 2018, Beijing China. pp. 1-4.

RAN2: "Reply LS to SA5 on L2 measurements", 3GPP Draft; R2-1810957—Reply LS to SA5 on L2 Measurements, 3rd Generation Partnership Project (3GPP) Jul. 8, 2018. pp. 1-12.

European Search Report, dated May 20, 2022. pp. 1-12.

* cited by examiner

A second network node receives data which carries a protocol data unit (PDU) and is sent by a first network node, where the PDU at least includes quality of service (QOS) information bearing the data, and the QOS information includes at least one of: a QOS flow identifier (QFI) indication of the data, or a fifth-generation QOS identifier (5QI) corresponding to the data — S302

DATA TRANSMISSION METHOD AND APPARATUS, DATA SENDING METHOD AND APPARATUS, AND DATA TRANSMISSION SYSTEM

CROSS-REFERENCE TO RELATED APPLICATIONS

This is a National Stage Application, filed under 35 U.S.C. 371, of International Patent Application No. PCT/CN2019/108611, filed on Sep. 27, 2019, which claims priority to a Chinese patent application No. 201811141708.3 filed with the CNIPA on Sep. 28, 2018, the disclosures of which are incorporated herein by reference in their entireties.

TECHNICAL FIELD

The present application relates to the field of communications, for example, to a data transmission method and apparatus, a data sending method and apparatus, and a data transmission system.

BACKGROUND

In a fifth-generation (5G) mobile communication system, a 5G base station is referred to as a new generation radio access network node (NG RAN Node or gNB). An interface between gNBs is referred to as an Xn interface, and an interface between a gNB and any one of other non-5G base stations is referred to as an X2 interface. The Xn/X2 interface may be classified into an Xn/X2 control plane interface (Xn-C/X2-C) and an Xn/X2 user plane interface (Xn-U/X2-U). The Xn-C/X2-C interface is used for transferring control plane information between base stations to implement an inter-base station control plane function. The Xn-U/X2-U interface is used for transferring user plane data between base stations and transmitting status feedback.

Furthermore, the 5G base station supports the central unit (CU)/distributed unit (DU) separate architecture. One separate 5G base station may be divided into two parts, i.e., a gNB-CU and a gNB-DU.

FIG. 1 is a schematic diagram of a 5G network architecture and interfaces. As shown in FIG. 1, in one separate 5G base station, there is only one gNB-CU serving as a central control node. One gNB-CU may connect and manage multiple gNB-DUs, and each gNB-DU is connected to the one gNB-CU through an interface. Packet data convergence protocol (PDCP) protocol entities and service discovery application profile (SDAP) of the base station are located in the gNB-CU, and radio link control (RLC)/media access control (MAC)/physical layer (PHY) protocol entities of the base station are located in the gNB-DUs. In the case of CU/DU separation, during the process of data transmission, the PDCP and RLC are located in different network nodes.

In the case of CU/DU separation, the SDAP/PDCP is located on a CU side, and only the CU can recognize the quality of service (QOS) information of user data while the QOS information of transmitted data cannot be recognized on a DU side. In the case of a multi-base station connection, the SDAP is located at a base station node where the PDCP is located, and only that base station can recognize the QOS information of the transmitted data while any offloading base station cannot recognize the QOS information of the transmitted data.

As a result, the DU or the offloading base station, when sending or receiving a data packet of one service bearer, can only perform statistics, for example, on the measurement of corresponding service bearer data for the service bearer, such as a throughput of service data radio bearer (DRB) data, a transmission delay of service DRB, a packet loss rate of service DRB due to congestion, an air interface loss packet rate of service DRB, an interface packet loss rate of service DRB, and so on. However, operators or network managers hope to perform statistics on service data having a certain type of QOS to provide the network performance measurement for services having a same QOS level, that is, the service data needs to be measured for the QOS level. For example, they hope to perform statistics on a throughput, a transmission delay, a packet loss due to congestion, an air interface packet loss rate, and an interface packet loss rate of a certain type of data at a QOS level. However, such QOS-based measurements are not supported currently.

Therefore, in the 5G and future communication networks, the issue of how to accurately measure service data at different QOS levels needs to be solved.

SUMMARY

The present disclosure provide a data transmission method and apparatus, a data sending method and apparatus, and a data transmission system to improve that the measurement for service data having different QOS levels is inaccurate in the related art.

According to the present disclosure, the data transmission method includes the following step: a second network node receives data which carries a protocol data unit (PDU) and is sent by a first network node, where the PDU at least includes QOS information bearing the data, and the QOS information includes at least one of a QOS flow identifier (QFI) indication of the data, or a fifth-generation QOS identifier (5QI) corresponding to the data.

In an embodiment, the method further includes steps described below: the second network node parses the QOS information, and performs a measurement on data having a same QOS level.

The step in which the second network node parses the QOS information and performs the measurement on the data having the same QOS level includes steps described below, the second network node selects the data having at least one of a same QFI indication or a same 5QI and performs the measurement on the data having at least one of the same QFI indication or the same 5QI.

According to the present disclosure, the data sending method includes the following steps: a first network node generates data carrying a PDU according to a type of the first network node, where the PDU at least includes QOS information bearing the data, and the QOS information includes at least one of a QFI indication of the data, or a 5QI corresponding to the data; and the first network node sends the data carrying the PDU to a second network node.

According to the present disclosure, the data transmission apparatus is located in a second network node and includes a reception module, the reception module is configured to receive data which carries a PDU and is sent by a first network node, where the PDU at least includes QOS information bearing the data, and the QOS information includes at least one of a QFI indication of the data, or a 5QI corresponding to the data.

The apparatus further includes a measurement module, which is configured to parse the QOS information and perform a measurement on data having a same QOS level.

The measurement module is further configured to select the data having at least one of a same QFI indication or a same 5QI and perform the measurement on the data having at least one of the same QFI indication or the same 5QI.

According to the present disclosure, the data sending apparatus is located in a first network node and includes a generation module and a sending module, the generation module is configured to generate data carrying a PDU according to a type of the first network node, where the PDU at least includes QOS information bearing the data, and the QOS information includes at least one of a QFI indication of the data, or a 5QI corresponding to the data; and the sending module is configured to send the data carrying the PDU to a second network node.

According to the present disclosure, the data transmission system includes a first network node and a second network node. The first network node is configured to generate data carrying a PDU according to a type of the first network node, where the PDU at least includes QOS information bearing the data, and the QOS information includes at least one of: a QFI indication of the data, or a 5QI corresponding to the data. The second network node is configured to receive the data carrying the PDU sent by the first network node.

The present disclosure further provides a storage medium, which is configured to store a computer program. The computer program is configured to, when executed, perform the steps in any one of method embodiments described above.

The present disclosure further provides an electronic apparatus, which includes a memory and a processor. The memory stores a computer program, and the processor is configured to execute the computer program to perform the steps in any one of method embodiments described above.

Through the present disclosure, since the data of both the sending network node and the receiving network node carries the QOS information including the QFI indication and the 5QI, the inaccurate measurement for service data having different QOS levels can be solved, thereby effectively implementing the accurate measurement of service data having different QOS levels and improving the measurement efficiency.

BRIEF DESCRIPTION OF DRAWINGS

The drawings described herein are used to provide a further understanding of the present application and form a part of the present application. The illustrative embodiments and the description thereof in the present application are used to explain the present application and not to limit the present application. In the drawings.

DETAILED DESCRIPTION

Hereinafter, the present application will be described in detail with reference to drawings and in conjunction with embodiments. It is to be noted that if not in collision, the embodiments and features therein in the present application can be combined with each other.

It is to be noted that the terms "first" and "second" in the description, claims and drawings of the present application are used to distinguish between similar objects and are not necessarily used to describe a particular order or sequence.

Figure 1:
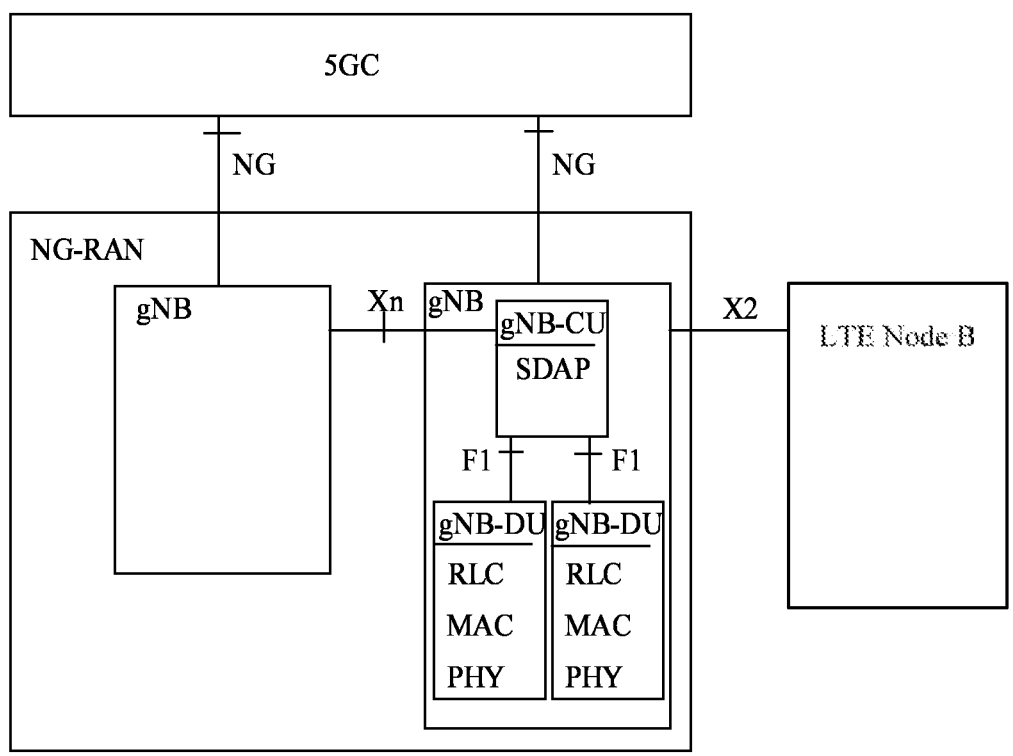
FIG. 1 is a schematic diagram of a 5G network architecture and interfaces.
Figures 2, 3:
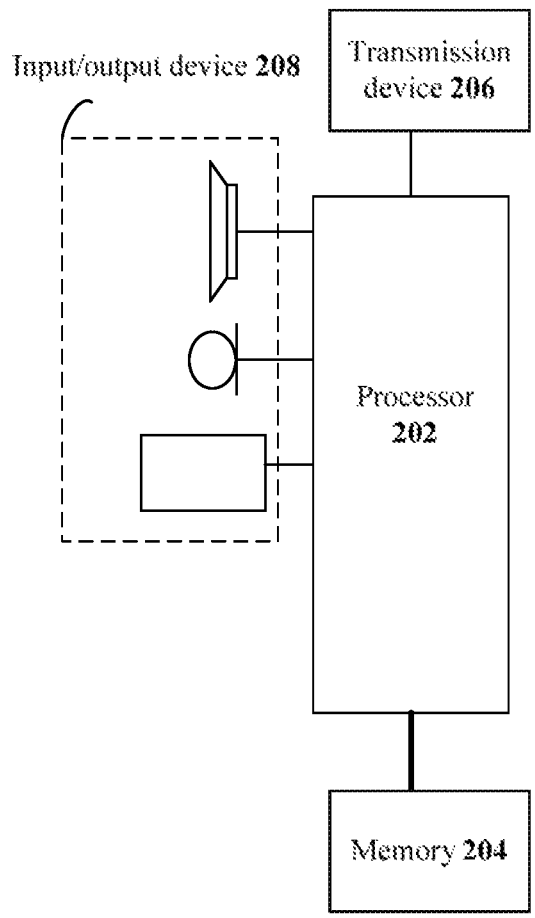
FIG. 2 is a structural block diagram of hardware of a network node for a transmission method according to an embodiment of the present disclosure.
FIG. 3 is a flowchart of a data transmission method according to an embodiment of the present disclosure.

The method embodiment provided by an embodiment one of the present application may be executed in a network node (e.g., a base station, a user equipment (UE), etc.) or another similar computing device. FIG. 2 is a structural block diagram of hardware of a network node for a transmission method according to an embodiment of the present disclosure. As shown in FIG. 2, the network node may include one or more (only one is shown in FIG. 2) processors 202 (each processor 202 may include, but is not limited to, a processing apparatus such as a microcontroller unit (MCU) and a field programmable gate array (FPGA)), and a memory 204 configured to store data. The network node described above may further include a transmission device 206 configured to implement a communication function and an input/output device 208. It is to be appreciated by those of ordinary skill in the art that the structure shown in FIG. 2 is merely illustrative and not intended to limit the structure of the preceding network node. For example, the network node may further include more or less components than the components shown in FIG. 2, or has a configuration different from the configuration shown in FIG. 2.

The memory 204 may be configured to store a computer program such as a software program and a module of application software, for example, a computer program corresponding to the transmission method in the embodiments of the present disclosure. The processors 202 execute the computer program stored in the memory 204 to perform various function applications and data processing, that is, to implement the methods described above. The memory 204 may include a high-speed random access memory, and may further include nonvolatile memories such as one or more magnetic storage devices, flash memories, or other nonvolatile solid-state memories. In some examples, the memory 204 may further include memories located remotely relative to the processors 202, and these remote memories may be connected to the network node via a network. Examples of the preceding network include, but are not limited to, the Internet, an intranet, a local area network, a mobile communication network, and a combination thereof.

The transmission device 206 is configured to receive or send data via a network. Examples of the preceding network may include a wireless network provided by a communication provider of the network node. In one example, the transmission device 206 includes a network interface controller (NIC), which may be connected to other network devices via a base station to communicate with the Internet.

In one example, the transmission device 206 may be a radio frequency (RF) module, which is configured to communicate with the Internet in a wireless way.

Embodiment One

This embodiment provides a data transmission method executed on the network node described above. FIG. 3 is a flowchart of a data transmission method according to an embodiment of the present disclosure. As shown in FIG. 3, the method includes steps described below.

In step 302, a second network node receives data which carries a PDU and is sent by a first network node, where the PDU at least includes QOS information bearing the data, and the QOS information includes at least one of: a QFI indication of the data, or a 5QI corresponding to the data.

It is to be noted that the QOS level refers to a service scheduling level corresponding to a priority, which is provided for services having different quality of service requirements by a network using a variety of underlying technologies. For example, service data having relatively high-quality requirements may be specified with a relatively high QOS level. The key of the QOS classification procedure is to configure different priorities for various packets. 5G user services with different QOS requirements and unbalanced physical distributions of user services have different demands on the networking deployment and data transmission performance of the 5G network, and these different types of data services are often interleaved. The 5G network has a variety of nodes and complex structures. The transmission performances of various types of service data having different QOS levels need to be measured, and the measurement on these data has great significance for observing the performances of the network and evaluating whether the network services have reached the predetermined goal.

It is to be noted that any other identifier information that may reflect QOS characteristics is within the scope of the embodiments of the present disclosure, which will not be described in detail herein.

In an embodiment, when the first network element is a base station where a PDCP layer is located, the second network node is a UE and/or a base station where an RLC layer is located.

In an embodiment, when the first network element is a base station where an RLC layer is located, the second network node is a UE and/or a base station where a PDCP layer is located.

In an embodiment, when the first network node is a UE, the second network node is a base station where a PDCP layer is located and/or a base station where an RLC layer is located.

Table 1 gives the format definition of the PDCP PDU used in the embodiments of the present disclosure. Table 1 is shown below.

TABLE 1

| D/C | R |
|---|---|
| QOS | |
| PDCP SN | |
| Data | |
| MAC-I | |

It can be seen that in this embodiment, the PDCP PDU is provided with a QOS field carrying a QFI indication of the data, a 5QI of the data and other identifier information reflecting the QOS characteristics.

When the first network node is the base station where the RLC layer is located, a first gateway may set the QOS in at least one type of the following PDUs: an RLC transparent mode data (TMD) PDU, an RLC unacknowledged mode data (UMD) PDU, or an RLC acknowledged mode data (AMD) PDU.

Table 2 gives the format definition of the RLC AMD PDU used in the embodiments of the present disclosure. Table 2 is shown below.

TABLE 2

| D/C | P | SI | R |
|---|---|---|---|
| | QOS | | |
| | SN | | |
| | SO | | |
| | Data | | |

It can be seen that in this embodiment, the RLC AMD PDU is provided with a QOS field carrying a QFI indication of the data, a 5QI of the data and other identifier information reflecting the QOS characteristics.

Table 3 gives the format definition of the RLC UMD PDU used in the embodiments of the present disclosure. Table 3 is shown below.

TABLE 3

| SI | | R |
|---|---|---|
| | QOS | |
| | SN | |
| | SO | |
| | Data | |

It can be seen that in this embodiment, the RLC UMD PDU is provided with a QOS field carrying a QFI indication of the data, a 5QI of the data and other identifier information reflecting the QOS characteristics.

Table 4 gives the format definition of the RLC TMD PDU used in the embodiments of the present disclosure. Table 4 is shown below.

TABLE 4

| QOS |
|---|
| Data |

It can be seen that in this embodiment, the RLC TMD PDU is provided with a QOS field carrying a QFI indication of the data, a 5QI of the data and other identifier information reflecting the QOS characteristics.

The PDU is encapsulated in a 5G new radio in unlicensed spectrum (NR-U) PDU, where an extension header structure of the NR-U PDU includes the QOS information.

It is to be noted that the first network node may encapsulate the PDU in a general NR-U PDU, the extension header of which carries the QOS information, regardless of whether the first network node is the base station where the RLC layer is located or the base station where the PDCP layer is located.

Table 5 gives the format definition of the extension header of the NR-U PDU used in the embodiments of the present disclosure. The name of the extension header is DL USER DATA, as shown in Table 5.

TABLE 5

| Bits | | | | | | | |
|---|---|---|---|---|---|---|---|
| 7 | 6 | 5 | 4 | 3 | 2 | 1 | 0 |
| PDU Type (=0) | | | Spare | DL Discard Blocks | DL Flush | Report polling | |
| Spare | | | | | Assistance Info. Report Polling Flag | | Retransmission flag |
| NR-U Sequence Number | | | | | | | |
| NR-U QOS | | | | | | | |
| DL discard NR PDCP PDU SN | | | | | | | |
| DL discard Number of blocks | | | | | | | |
| DL discard NR PDCP PDU SN start (first block) | | | | | | | |
| Discarded Block size (first block) | | | | | | | |
| ... | | | | | | | |
| DL discard NR PDCP PDU SN start (last block) | | | | | | | |
| Discarded Block size (last block) | | | | | | | |
| Padding | | | | | | | |

It can be seen that in this embodiment, the NR-U PDU is provided with a QOS field carrying a QFI indication of the data, a 5QI of the data and other identifier information reflecting the QOS characteristics.

It is to be noted that other fields in the extension header of the NR-U PDU, which are optional and not limited to the above fields, are used for carrying related information about the NR-U PDU.

It is to be noted that any other network node that can implement the base station function is within the scope of this embodiment, which will not be described in detail herein.

The second network node receives the data which carries the PDU and is sent by the first network node through at least one of the following interfaces: an F1 user plane (F1-U) interface, an X2-U interface, or an Xn-U interface.

The method further includes steps described below, the second network node parses the QOS information, and performs a measurement on data having a same QOS level.

The step in which the second network node parses the QOS information and performs the measurement on the data having the same QOS level includes steps described below, the second network node selects the data having at least one of a same QFI indication or a same 5QI and performs the measurement on the data having at least one of the same QFI indication or the same 5QI.

The measurement includes at least one of: a measurement for a throughput of the data, a measurement for a transmission delay of the data, a measurement of a packet loss rate of the data, a measurement of an air interface packet loss rate of the data, or a measurement of an interface packet loss rate of the data.

The step of performing the measurement on the data having the same QOS level includes at least one of the following different granularities: a measurement of the pieces of data having a same QOS level of a plurality of different QOS levels for a same UE, a measurement of the pieces of data having a same QOS level of a plurality of different QOS levels for a same cell, a measurement of the pieces of data having a same QOS level of a plurality of different QOS levels for a same node, a measurement of the pieces of data having a same QOS level of a plurality of different QOS levels for a same slice, or a measurement of the pieces of data having a same QOS level of a plurality of different QOS levels for a same PDU session.

In an embodiment, the method further includes a step that: the second network node schedules a priority of MAC layer information according to the QOS information.

Through the above steps, the inaccurate measurement for service data having different QOS levels can be solved, thereby effectively implementing the accurate measurement of service data having different QOS levels and improving the measurement efficiency.

From the description of the embodiments described above, it will be apparent to those skilled in the art that the methods in the embodiments described above may be implemented by software plus a necessary general-purpose hardware platform, or may of course be implemented by hardware. However, in many cases, the former is a preferred implementation. Based on this understanding, the solution provided in the present application substantially, or the part contributing to the related art, may be embodied in the form of a software product. The computer software product is stored on a storage medium (such as a read-only memory (ROM)/random access memory (RAM), a magnetic disk, or an optical disk) and includes several instructions for enabling a UE device (which may be a mobile phone, a computer, a server or a network device) to perform the method of each embodiment of the present application.

Embodiment Two

Figure 4:
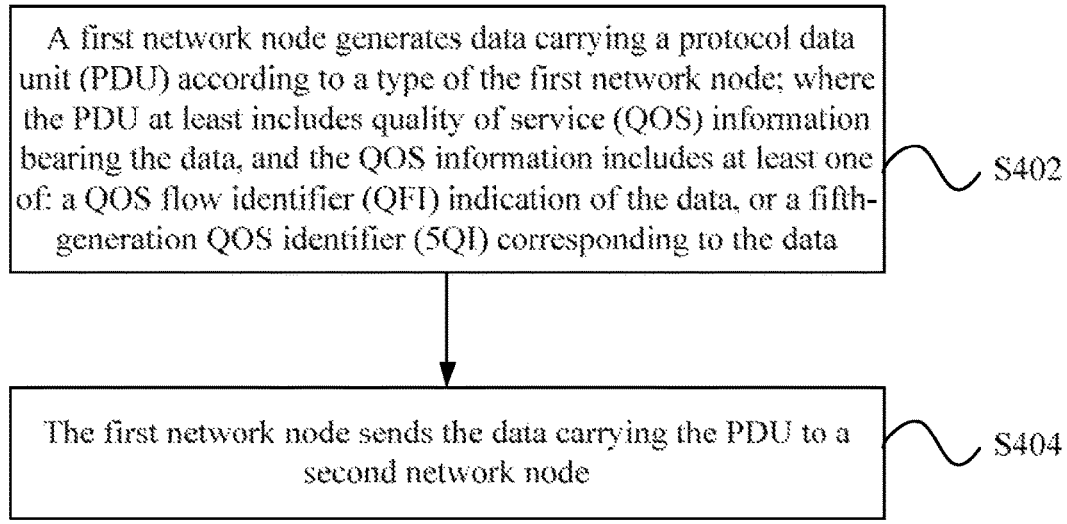
FIG. 4 is a flowchart of a data sending method according to an embodiment of the present disclosure.

This embodiment provides a data transmission method executed on the network node described above, and what has been described will not be repeated herein. FIG. 4 is a flowchart of a data sending method according to an embodiment of the present disclosure. As shown in FIG. 4, the method includes steps described below.

In step 402, a first network node generates data carrying a PDU according to a type of the first network node, where the PDU at least includes QOS information bearing the data, and the QOS information includes at least one of: a QFI indication of the data, or a 5QI corresponding to the data.

In step 404, the first network node sends the data carrying the PDU to a second network node.

The type of the first network node includes at least one of: a base station where a PDCP layer is located, a base station where an RLC layer is located, or a UE.

In an embodiment, the method further includes a step that: in a case where the first network node is the base station where the PDCP layer is located, a PDCP PDU carrying the QOS information is generated in the PDCP layer of the data.

In an embodiment, the method further includes a step that: in a case where the first network node is the base station where the RLC layer is located, an RLC PDU carrying the QOS information is generated in the PDCP layer of the data.

In an embodiment, the method further includes a step that: in a case where the first network node is the UE, a PDCP PDU carrying the QOS information and/or an RLC PDU carrying the QOS information is generated in the data.

The first network node encapsulates the PDU in an NR-U PDU, where an extension header structure of the NR-U PDU includes the QOS information.

The first network node sends the data carrying the PDU through at least one of the following interfaces: an F1-U interface, an X2-U interface, or an Xn-U interface.

This embodiment further provides the following scenarios to facilitate understanding of the schemes in this embodiment.

Scenario One

Figure 5:
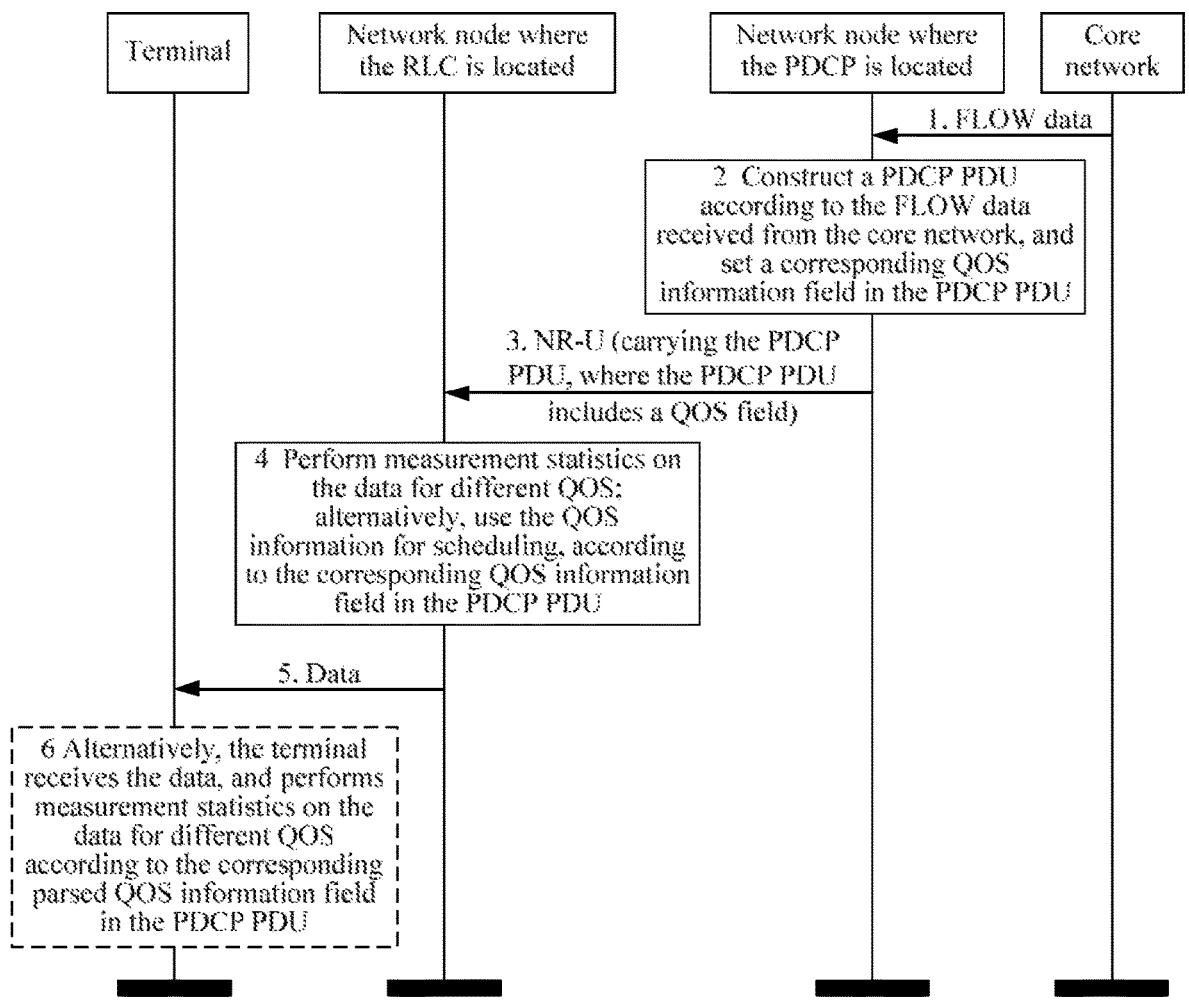
FIG. 5 is a schematic diagram of a downlink data transmission according to an embodiment of the present disclosure.

FIG. 5 is a schematic diagram of a downlink data transmission according to an embodiment of the present disclosure. As shown in FIG. 5, the transmission includes steps described below.

In step 1, a core network sends FLOW data to a network node where the PDCP is located (which may be a gNB-CU, or a base station where the PDCP is located) through an interface with the base station.

In step 2, the network node where the PDCP is located constructs a PDCP PDU, and sets corresponding QOS field information in the PDCP PDU.

In step 3, the network node where the PDCP is located encapsulates PDCP PDU data in an NR-U PDU through an NR-U (F1/X2/Xn) interface, and sends the NR-U PDU to a network node where the RLC is located (which may be a gNB-DU, or an offloading base station).

In step 4, the network node where the RLC is located performs measurement statistics on the data for different QOS according to a QOS information field corresponding to the PDCP PDU encapsulated in the NR-U PDU, and uses the QOS information for scheduling a priority of MAC layer information.

In step 5, the network node where the RLC is located sends service data to a UE through an air interface.

In step 6, the UE performs measurement statistics on the data for different QOS according to the corresponding parsed QOS information field in the PDCP PDU.

Scenario Two

Figure 6:
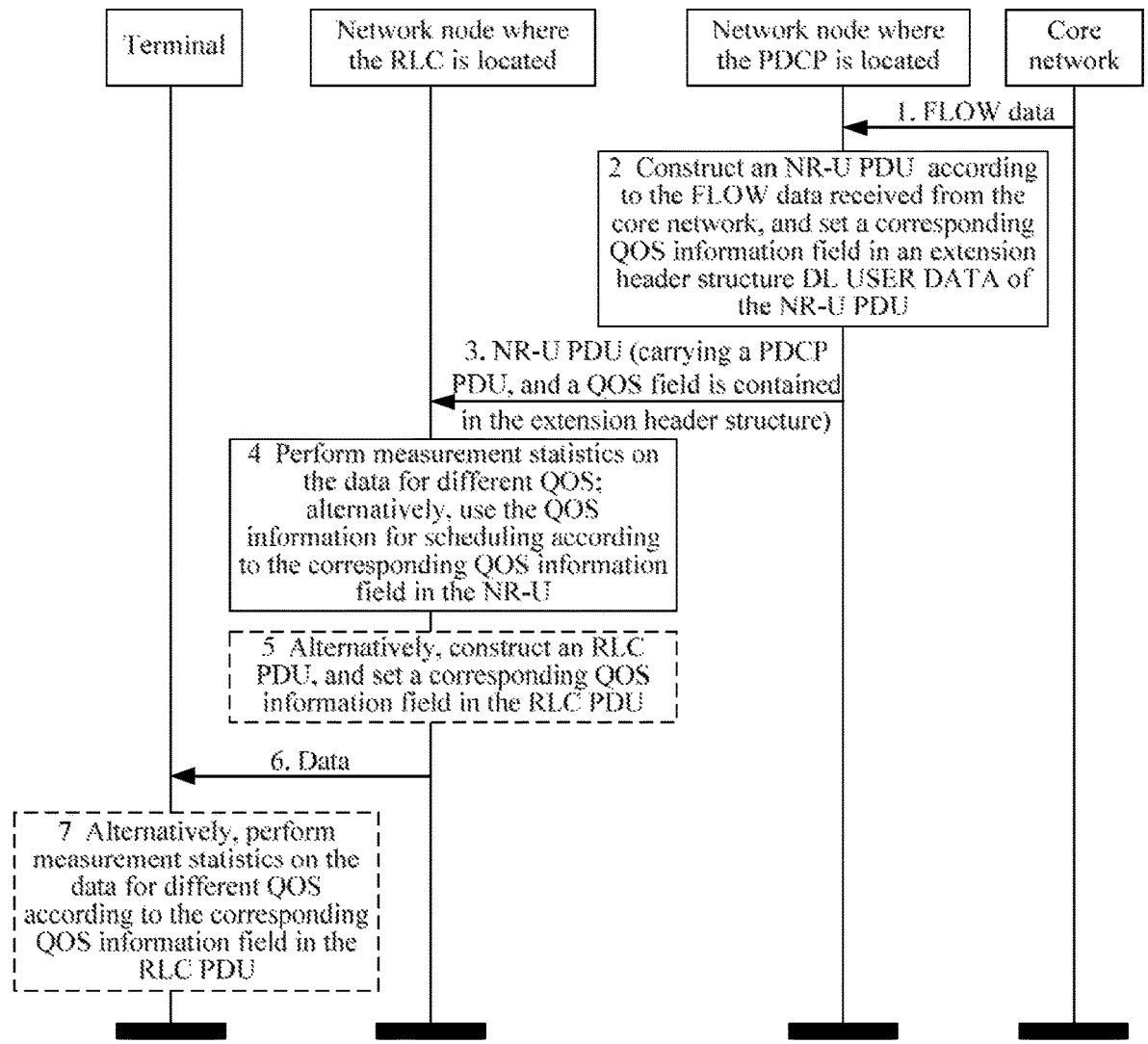
FIG. 6 is a schematic diagram of another downlink data transmission according to an embodiment of the present disclosure.

FIG. 6 is a schematic diagram of another downlink data transmission according to an embodiment of the present disclosure. As shown in FIG. 6, the transmission includes steps described below.

In step 1, the core network sends the FLOW data to the network node where the PDCP is located (which may be a gNB-CU, or a base station where the PDCP is located) through an interface with the base station.

In step 2, the network node where the PDCP is located constructs a PDCP PDU, encapsulates PDCP PDU data in an NR-U PDU, and sets corresponding QOS field information in an extension header structure of the NR-U PDU.

In step 3, the network node where the PDCP is located sends the NR-U PDU to the network node where the RLC is located (which may be a gNB-DU, or an offloading base station) through an NR-U (F1/X2/Xn) interface.

In step 4, the network node where the RLC is located performs measurement statistics on the data for different QOS according to a corresponding QOS information field in the extension header of the NR-U PDU; alternatively, the network node where the RLC is located uses the QOS information for scheduling a priority of sending MAC layer information.

In step 5, the network node where the RLC is located constructs an RLC PDU, and sets corresponding QOS field information in the RLC PDU.

In step 6, the network node where the RLC is located sends service data to the UE through an air interface.

In step 7, the UE performs measurement statistics on the data for different QOS according to the corresponding parsed QOS information field in the RLC PDU.

Scenario Three

Figure 7:
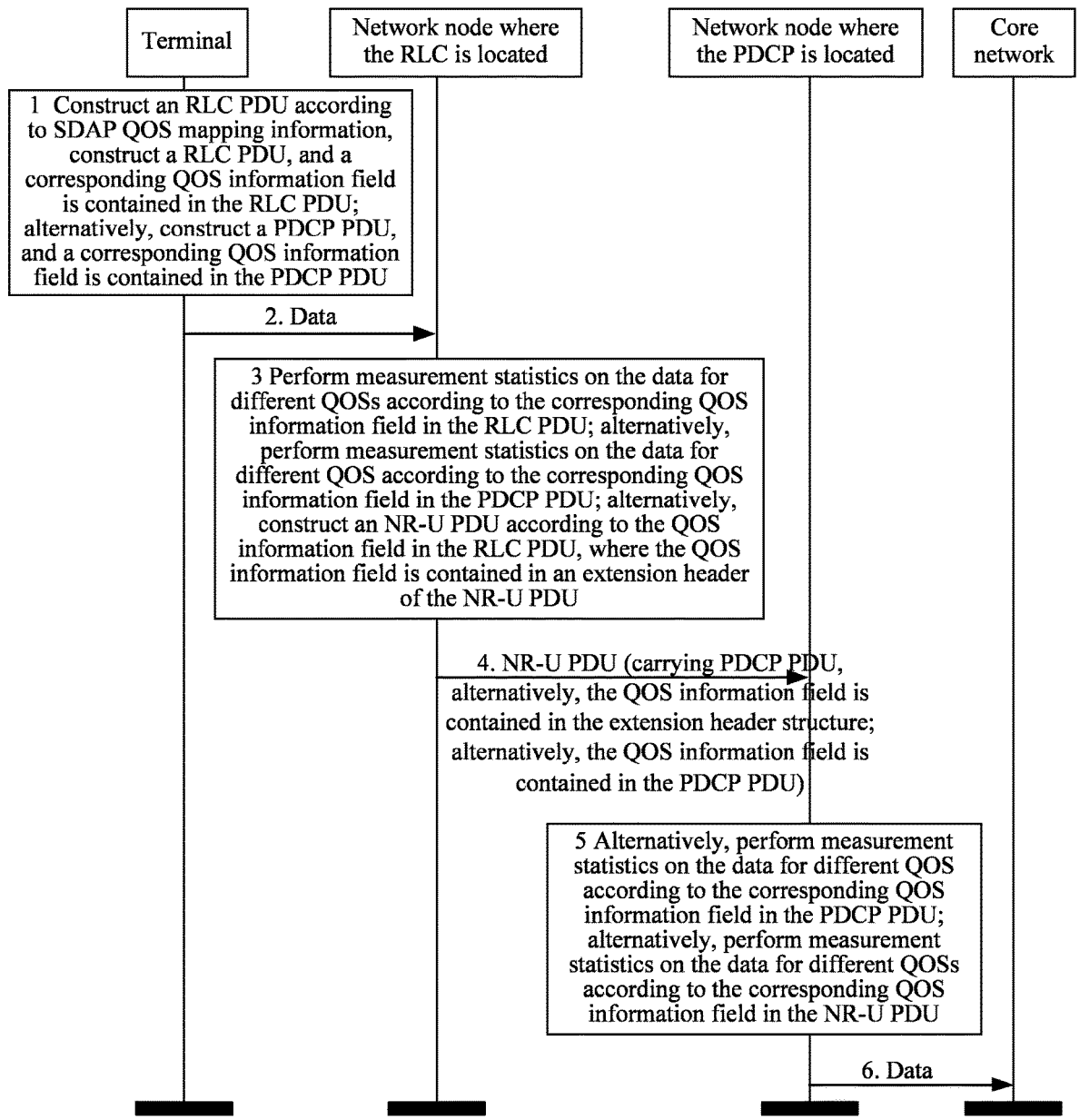
FIG. 7 is a schematic diagram of an uplink data transmission according to an embodiment of the present disclosure.

FIG. 7 is a schematic diagram of an uplink data transmission according to an embodiment of the present disclosure. As shown in FIG. 7, the transmission includes steps described below.

In step 1, an RLC PDU is constructed according to SDAP QOS mapping information, and a corresponding QOS information field is contained in the RLC PDU; alternatively, a PDCP PDU is constructed, and a corresponding QOS information field is contained in the PDCP PDU.

In step 2, a terminal sends data to the network node where the RLC is located (which may be a gNB-DU, or an offloading base station) through an air interface.

In step 3, the network node where the RLC is located performs measurement statistics on the data for different QOS according to a corresponding QOS information field in the RLC PDU, and constructs an NR-U PDU according to the QOS information field in the RLC PDU, where the QOS information field is contained in an extension header of the NR-U PDU; alternatively, the network node where the RLC is located performs measurement statistics on the data for different QOS according to the corresponding QOS information field in the PDCP PDU.

In step 4, the network node where the RLC is located sends the NR-U PDU to the network node where the PDCP is located.

In step 5, the network node where the PDCP is located performs measurement statistics on the data for different QOS according to the corresponding QOS information field in the PDCP PDU; alternatively, the network node where the PDCP is located performs measurement statistics on the data for different QOS according to the corresponding QOS information field in the NR-U PDU.

In step 6, the network node where the PDCP is located sends the data to the core network.

Embodiment Three

This embodiment further provides a data transmission apparatus. The apparatus is used for implementing the above-mentioned embodiments and alternative implementation modes, and what has been described will not be repeated herein. As used below, the term "module" may be software, hardware, or a combination thereof capable of implementing predetermined functions. The apparatus in the embodiment described below is preferably implemented by software, but the implementation by hardware or by a combination of software and hardware is also possible and conceivable.

Figure 8:
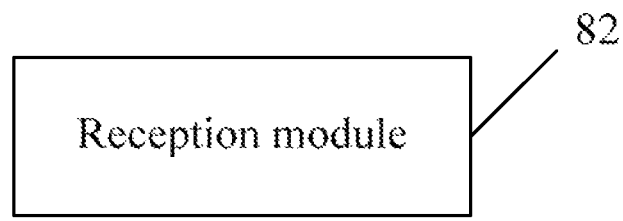
FIG. 8 is a structural block diagram of a data transmission apparatus according to an embodiment of the present disclosure.

FIG. 8 is a structural block diagram of a data transmission apparatus according to an embodiment of the present disclosure. As shown in FIG. 8, the apparatus includes a reception module 82.

The reception module 82 is configured to receive data which carries a PDU and is sent by a first network node, where the PDU at least includes QOS information bearing the data, and the QOS information includes at least one of: a QFI indication of the data, or a 5QI corresponding to the data.

In an embodiment, the apparatus further includes a measurement module, which is configured to parse the QOS information and perform a measurement on data having a same QOS level.

In an embodiment, the measurement module is further configured to select the data having at least one of a same QFI indication or a same 5QI and perform the measurement on the data having at least one of the same QFI indication or the same 5QI.

It is to be noted that each module described above may be implemented by software or hardware. An implementation by hardware may, but not necessarily, be performed in the following manners: the various modules described above are located in the same processor, or the various modules described above are located in their respective processors in any combination form.

Embodiment Four

This embodiment further provides a data sending apparatus. The apparatus is used for implementing the above-mentioned embodiments and alternative implementation modes, and what has been described will not be repeated herein. As used below, the term "module" may be software, hardware, or a combination thereof capable of implementing predetermined functions. The apparatus in the embodiment described below is preferably implemented by software, but the implementation by hardware or by a combination of software and hardware is also possible and conceivable.

Figure 9:
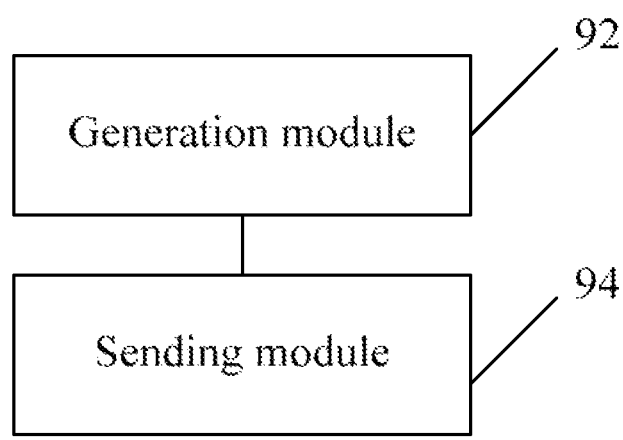
FIG. 9 is a structural block diagram of a data sending apparatus according to an embodiment of the present disclosure.

FIG. 9 is a structural block diagram of a data sending apparatus according to an embodiment of the present disclosure. As shown in FIG. 9, the apparatus includes a generation module 92 and a sending module 94.

The generation module 92 is configured to generate data carrying a PDU according to a type of the first network node, where the PDU at least includes QOS information bearing the data, and the QOS information includes at least one of: a QFI indication of the data, or a 5QI corresponding to the data.

The sending module 94 is configured to send the data carrying the PDU to a second network node.

Embodiment Five

This embodiment further provides a data transmission system. The apparatus is used for implementing the above-mentioned embodiments and alternative implementation modes, and what has been described will not be repeated herein.

Figure 10:
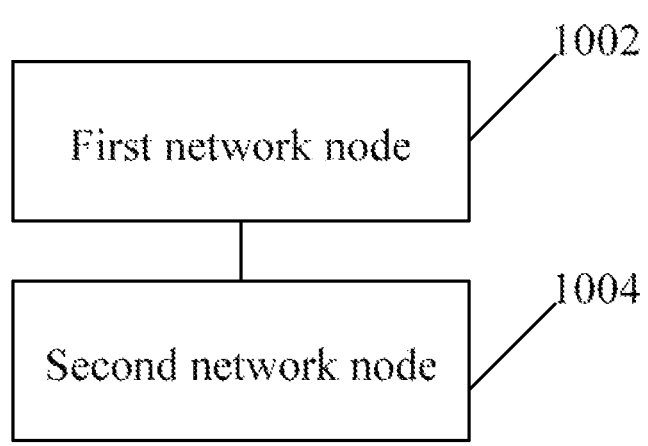
FIG. 10 is a structural diagram of a data transmission system according to an embodiment of the present disclosure.

FIG. 10 is a structural diagram of a data transmission system according to an embodiment of the present disclosure. As shown in FIG. 10, the system includes a first network node 1002 and a second network node 1004.

The first network node 1002 is configured to generate data carrying a PDU according to a type of the first network node 1002, where the PDU at least includes QOS information bearing the data, and the QOS information includes at least one of: a QFI indication of the data, or a 5QI corresponding to the data.

The second network node 1004 is configured to receive the data carrying the PDU sent by the first network node 1002.

The second network node 1004 is further configured to parse the QOS information, and perform a measurement on the data having a same QOS level.

Embodiment Six

The embodiments of the present disclosure further provide a storage medium. The storage medium is configured to store a computer program. The computer program is configured to, when executed, perform steps in any above-mentioned method embodiment.

In this embodiment, the above storage medium can be configured to store a computer program for performing step described below.

In S1, a second network node receives data which carries a PDU and is sent by a first network node, where the PDU at least includes QOS information bearing the data, and the QOS information includes at least one of: a QFI indication of the data, or a 5QI corresponding to the data.

In this embodiment, the above storage medium may be configured to store a computer program for performing steps described below.

In S1, a first network node generates data carrying a PDU according to a type of the first network node, where the PDU at least includes QOS information bearing the data, and the QOS information includes at least one of: a QFI indication of the data, or a 5QI corresponding to the data.

In S2, the first network node sends the data carrying the PDU to a second network node.

In this embodiment, the storage medium may include, but is not limited to, a USB flash disk, a read-only memory (ROM), a random access memory (RAM), a mobile hard disk, a magnetic disk, an optical disk or another medium capable of storing a computer program.

The embodiments of the present disclosure further provide an electronic apparatus. The electronic apparatus includes a memory and a processor. The memory stores a computer program, and the processor is configured to execute the computer program to perform the steps in any one of the method embodiments described above.

The electronic apparatus may further include a transmission device and an input/output device. Both the transmission device and the input/output device are connected to the processor.

In this embodiment, the above-mentioned processor may be configured to perform the step described below through a computer program.

In S1, a second network node receives data which carries a PDU and is sent by a first network node, where the PDU at least includes QOS information bearing the data, and the QOS information includes at least one of a QFI indication of the data, or a 5QI corresponding to the data.

In this embodiment, the above-mentioned processor may be configured to perform the steps described below through a computer program.

In S1, a first network node generates data carrying a PDU according to a type of the first network node, where the PDU at least includes QOS information bearing the data, and the QOS information includes at least one of a QFI indication of the data, or a 5QI corresponding to the data.

In S2, the first network node sends the data carrying the PDU to a second network node.

As for examples in this embodiment, reference may be made to the examples described in the above embodiments and alternative implementation modes, and the examples will not be repeated in this embodiment.

Apparently, it should be understood by those skilled in the art that each of the modules or steps of the present application described above may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any particular combination of hardware and software.

The above are merely preferred embodiments of the present application and are not intended to limit the present application. For those skilled in the art, the present application may have various modifications and variations. Any modifications, equivalent substitutions, improvements and the like made within the principle of the present application should fall within the scope of the present application.

What is claimed is:

1. A data transmission method, comprising:
receiving, by a second network node, data which carries a protocol data unit (PDU) and is sent by a first network node, wherein the PDU comprises quality of service (QOS) information bearing the data, and the QOS information comprises at least one of: a QOS flow identifier (QFI) indication of the data, or a fifth-generation QOS identifier (5QI) corresponding to the data;
parsing, by the second network node, the QOS information, and
performing, by the second node, a measurement on pieces of data having a same QOS level, wherein the pieces of data having the same QOS level is determined according to the QOS information comprising at least one of: the QFI indication of the data, or the 5QI corresponding to the data; and
scheduling, by the second network node, a priority of media access control (MAC) layer information according to the QOS information;
wherein the performing, by the second node, the measurement on the pieces of data having the same QOS level comprises performing the measurement under the following different granularities for the pieces of data having the same QOS level of a plurality of different QOS levels, which refer to a service scheduling level that is provided for services having different quality of service requirements corresponding to the priority of MAC layer information:
a measurement of the pieces of data having the same QOS level of a plurality of different QOS levels for a same cell; or
a measurement of the pieces of data having the same QOS level of a plurality of different QOS levels for a same slice.

2. The method of claim 1, wherein parsing, by the second network node, the QOS information, and performing the measurement on the pieces of data having the same QOS level comprise:
selecting, by the second network node, the pieces of data having at least one of a same QFI indication or a same 5QI, and performing the measurement on the pieces of data having at least one of the same QFI indication or the same 5QI.

3. The method of claim 1, wherein the measurement comprises at least one of:
a measurement for a throughput of the data;
a measurement for a transmission delay of the data;
a measurement of a packet loss rate of the data;
a measurement of an air interface packet loss rate of the data; or
a measurement of an interface packet loss rate of the data.

4. The method of claim 1, wherein in a case where the first network node is a base station where a packet data convergence protocol (PDCP) layer is located, the second network node is at least one of a user equipment (UE) or a base station where a radio link control (RLC) protocol layer is located.

5. The method of claim 1, wherein in a case where the first network node is a base station where a radio link control (RLC) layer is located, the second network node is at least one of a user equipment (UE) or a base station where a packet data convergence protocol (PDCP) layer is located.

6. The method of claim 1, wherein in a case where the first network node is a user equipment (UE), the second network node is at least one of a base station where a packet data convergence protocol (PDCP) layer is located or a base station where a radio link control (RLC) layer is located.

7. The method of claim 4, wherein the PDU is encapsulated in a 5G new radio in unlicensed spectrum (NR-U) PDU, and an extension header structure of the NR-U PDU comprises the QOS information.

8. The method of claim 1, wherein the second network node receives the data which carries the PDU and is sent by the first network node through at least one of the following interfaces:
an F1 user plane (F1-U) interface, an X2 user plane (X2-U) interface, or an Xn user plane (Xn-U) interface.

9. A data sending method, comprising:
generating, by a first network node, data carrying a protocol data unit (PDU) according to a type of the first network node; wherein the PDU comprises quality of service (QOS) information bearing the data, and the QOS information comprises at least one of: a QOS flow identifier (QFI) indication of the data, or a fifth-generation QOS identifier (5QI) corresponding to the data; and
sending, by the first network node, the data carrying the PDU to a second network node,
wherein the QOS information comprised in the PDU is used for the second network node to determine pieces of data having a same QOS level and perform a measurement on the pieces of data having the same QOS level;
wherein the measurement performed on the pieces of data having the same QOS level comprises a measurement under the following different granularities for the pieces of data having the same QOS level of a plurality of different QOS levels, which refer to a service scheduling level that is provided for services having different quality of service requirements corresponding to a priority of media access control (MAC) layer information:
a measurement of the pieces of data having the same QOS level of a plurality of different QOS levels for a same cell; or
a measurement of the pieces of data having the same QOS level of a plurality of different QOS levels fora same slice.

10. The method of claim 9, wherein a type of the first network node comprises at least one of: a base station where a packet data convergence protocol (PDCP) layer is located, a base station where a radio link control (RLC) protocol layer is located, or a user equipment (UE).

11. The method of claim 10, further comprising: in a case where the first network node is the base station where the PDCP layer is located, generating, in the PDCP layer of the data, a PDCP PDU carrying the QOS information;
in a case where the first network node is the base station where the RLC layer is located, generating, in the RLC layer of the data, an RLC PDU carrying the QOS information; or
in a case where the first network node is the UE, generating, in the data, at least one of a PDCP PDU carrying the QOS information or an RLC PDU carrying the QOS information.

12. The method of claim 11, further comprising: encapsulating, by the first network node, the PDU in a 5G new radio in unlicensed spectrum (NR-U) PDU, wherein an extension header structure of the NR-U PDU comprises the QOS information;
wherein the first network node sends the data carrying the PDU through at least one of the following interfaces:
an F1 user plane (F1-U) interface, an X2 user plane (X2-U) interface, or an Xn user plane (Xn-U) interface.

13. A data transmission apparatus, disposed in a second network node, comprising a processor, a transmission device and a memory; wherein the memory stores a computer program;
the transmission device is configured to receive data which carries a protocol data unit (PDU) and is sent by a first network node, wherein the PDU comprises quality of service (QOS) information bearing the data, and the QOS information comprises at least one of: a QOS flow identifier (QFI) indication of the data, or a fifth-generation QOS identifier (5QI) corresponding to the data; and
the processor is configured to execute the computer program to parse the QOS information, and perform a measurement on pieces of data having a same QOS level, wherein the pieces of data having the same QOS level is determined according to the QOS information comprising at least one of: the QFI indication of the data, or the 5QI corresponding to the data; and
the processor is configured to execute the computer program to schedule a priority of media access control (MAC) layer information according to the QOS information;
wherein the processor is configured to execute the computer program to perform the measurement on the pieces of data having the same QOS level comprises a measurement under the following different granularities for the pieces of data having a same QOS level of a plurality of different QOS levels, which refer to a service scheduling level that is provided for services having different quality of service requirements corresponding to the priority of MAC layer information:
a measurement of the pieces of data having the same QOS level of a plurality of different QOS levels for a same cell; or
a measurement of the pieces of data having the same QOS level of a plurality of different QOS levels for a same slice.

14. The apparatus of claim 13, wherein the processor is configured to execute the computer program to select the pieces of data having at least one of a same QFI indication or a same 5QI, and perform the measurement on the pieces of data having at least one of the same QFI indication or the same 5QI.

15. A data sending apparatus, disposed in a first network node, comprising a processor, a transmission device and a memory; wherein the memory stores a computer program,
the processor is configured to execute the computer program to generate data carrying a protocol data unit (PDU) according to a type of the first network node;
wherein the PDU comprises quality of service (QOS) information bearing the data, and the QOS information comprises at least one of: a QOS flow identifier (QFI) indication of the data, or a fifth-generation QOS identifier (5QI) corresponding to the data; and
the transmission device is configured to send the data carrying the PDU to a second network node,
wherein the QOS information comprised in the PDU is used for the second network node to determine pieces of data having a same QOS level and perform a measurement on the pieces of data having the same QOS level;
wherein the measurement performed on the pieces of data having the same QOS level comprises a measurement under the following different granularities for the pieces of data having the same QOS level of a plurality of different QOS levels, which refer to a service scheduling level that is provided for services having different quality of service requirements corresponding to a priority of media access control (MAC) layer information:
a measurement of the pieces of data having the same QOS level of a plurality of different QOS levels for a same cell; or
a measurement of the pieces of data having the same QOS level of a plurality of different QOS levels for a same slice.

16. A data transmission system, comprising a first network node and a second network node;
wherein the first network node is configured to generate data carrying a protocol data unit (PDU) according to a type of the first network node, wherein the PDU comprises quality of service (QOS) information bearing the data, and the QOS information comprises at least one of: a QOS flow identifier (QFI) indication of the data, or a fifth-generation QOS identifier (5QI) corresponding to the data; and
the second network node is configured to receive the data which carries the PDU and is sent by the first network node, parse the QOS information and perform a measurement on pieces of data having a same QOS level, wherein the pieces of data having the same QOS level is determined according to the QOS information comprising at least one of: the QFI indication of the data, or the 5QI corresponding to the data; and the second network node is configured to schedule a priority of media access control (MAC) layer information according to the QOS information;
wherein the second network node is configured to perform the measurement on the pieces of data having the same QOS level comprises a measurement under the following different granularities for the pieces of data having the same QOS level of a plurality of different QOS levels, which refer to a service scheduling level that is provided for services having different quality of service requirements corresponding to the priority of MAC layer information:
a measurement of the pieces of data having the same QOS level of a plurality of different QOS levels for a same cell; or
a measurement of the pieces of data having the same QOS level of a plurality of different QOS levels for a same slice.

* * * * *